(No Model.) 4 Sheets—Sheet 1.
J. LUND.
HARVESTER BINDER.

No. 485,956. Patented Nov. 8, 1892.

Witnesses  
J. Edw. Maybee  
W. G. McMillan

Inventor  
John Lund  
by Donald C. Ridout & Co.  
attys.

(No Model.) 4 Sheets—Sheet 2.

J. LUND.
HARVESTER BINDER.

No. 485,956. Patented Nov. 8, 1892.

Witnesses
J. Edw. Maybee
W. G. McMillan

Inventor
John Lund
by Donald C. Ridout & Co.
Attys.

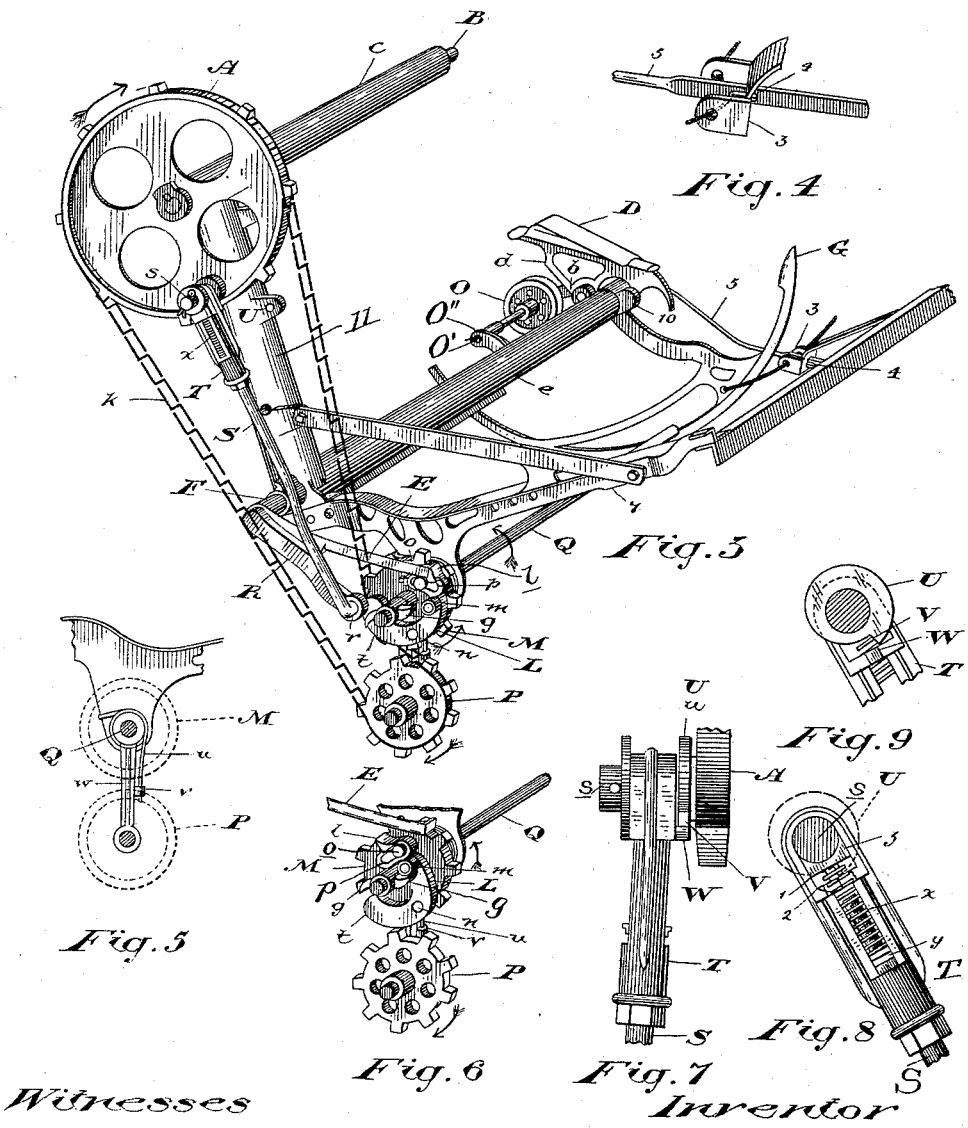

(No Model.) 4 Sheets—Sheet 4.

J. LUND.
HARVESTER BINDER.

No. 485,956. Patented Nov. 8, 1892.

Witnesses
J. Edw. Maybee
H. G. McMillan

Inventor
John Lund
by Donald C. Ridout & Co.
Attys

UNITED STATES PATENT OFFICE.

JOHN LUND, OF WOODSTOCK, CANADA.

HARVESTER-BINDER.

SPECIFICATION forming part of Letters Patent No. 485,956, dated November 8, 1892.

Application filed January 8, 1891. Serial No. 377,142. (No model.)

*To all whom it may concern:*

Be it known that I, JOHN LUND, of the town of Woodstock, in the county of Oxford, in the Province of Ontario, Canada, have invented certain new and useful Improvements in Harvester-Binders, of which the following is a specification.

The object of the invention is to provide simple and effective tripping and discharging mechanism and means for more effectually compressing the sheaf and regulating the tension of the binder-twine while the knot is being tied; and it consists in the peculiar construction, arrangement, and combinations of parts hereinafter more particularly described and then definitely claimed.

Figure 1:
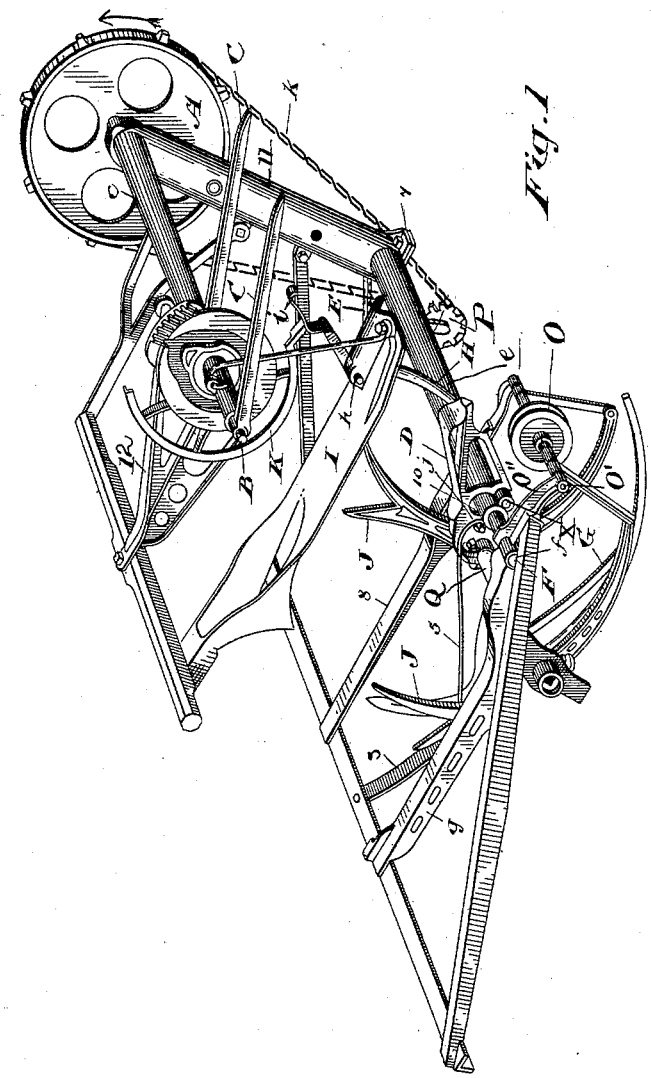
Figure 2:
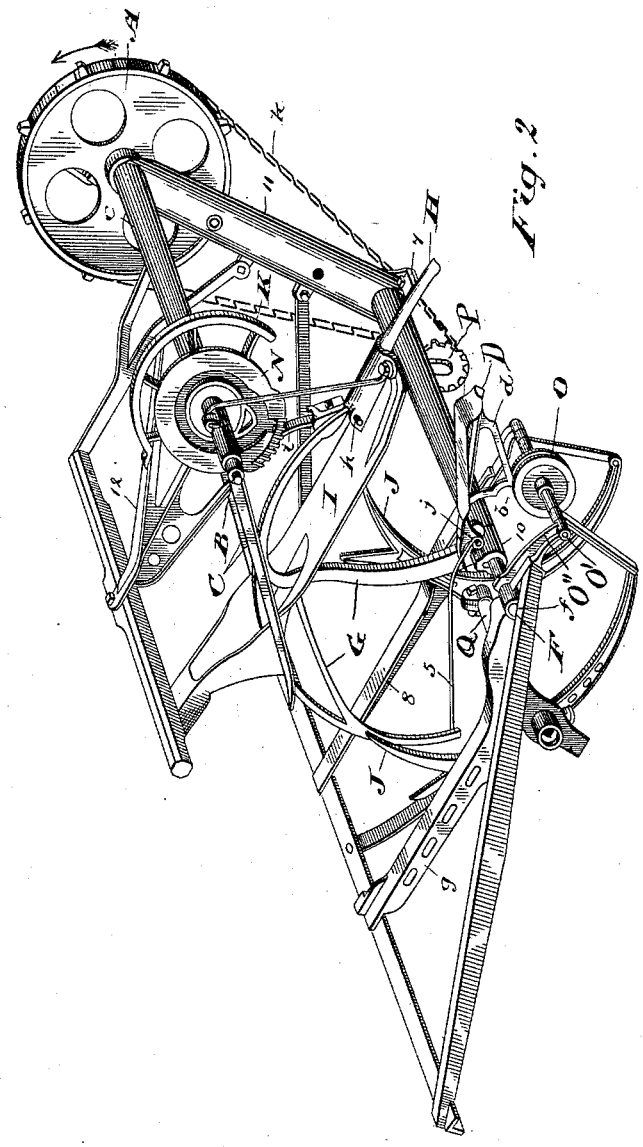
Figure 10:
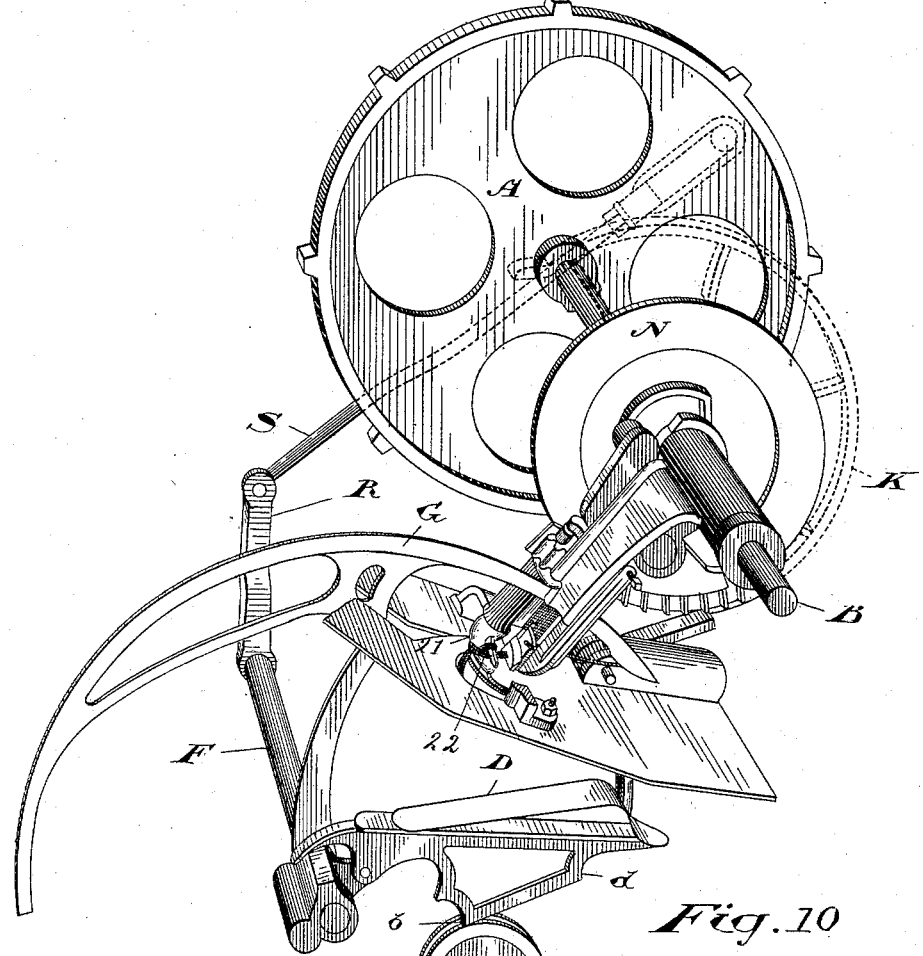
Figure 11:
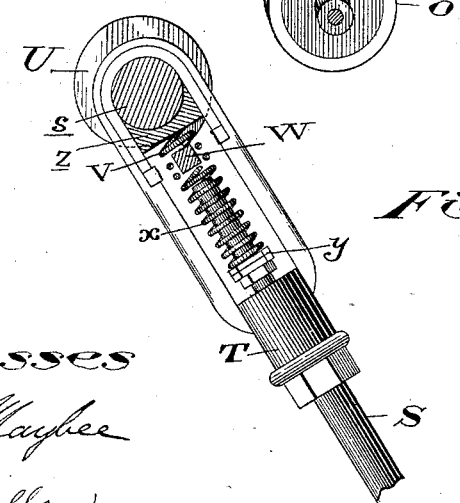

Figure 1 is a perspective view showing the position of the mechanism previous to the binding of the sheaf. Fig. 2 is a perspective view just prior to the discharge of the bound sheaf. Fig. 3 is a perspective detail showing the knotter-operating and needle rock-shaft gearing locked. Fig. 4 is a detail of the binder-twine tension-regulator. Fig. 5 is a detail of the idler-spring sprocket-wheel and attachments. Fig. 6 is a detail of the clutching mechanism and sprocket-wheels unlocked immediately after the clutch-tripping arm has been thrown out from engagment with the clutch. Fig. 7 is a side view in detail showing the connection of the pitman-rod and sprocket-wheel A. Fig. 8 is a front view in detail showing the connection of the pitman-rod to the sprocket-wheel A. Fig. 9 is a front view of the cam formed on sprocket-wheel A. Fig. 10 is a perspective skeleton view showing the relative positions of the needle, compressor-trip, needle-shaft, and crank-arm when the knot is ready for stripping. Fig. 11 is a detail showing a vertical section of the upper part of the pitman.

In Fig. 1, A is the sprocket-wheel, which moves in the direction of the arrow and operates the knotter-operating shaft B. C C are the discharge-arms in the position they assume after the bound sheaf has been discharged and before the compressor-trip D has released the clutch trip-arm E, Figs. 3 and 6, and thrown into gear the knotter-operating mechanism and operated the needle rock-shaft F. The needle-shaft F has bearings within the sleeve *e*, supported by frame-pieces 7 and 8, the end being journaled at *f* on the frame-piece *g*, and 10 is the hub of the needle, to which the end of compressor-trip D and tension-rod 5 are pivoted. G is the needle in the position it assumes after the sheaf has been discharged and before the compressor-trip D has been tripped. H is the compressor-arm, pivoted at *h* to the breast-plate I, the upper end *i* being preferably curved, as shown in the drawings, with its extremity hook-shaped, and held in position while the sheaf is being packed against it by the packers J J by the pressure of the eccentric semicircle K (carried by the knotter cam-disk N, mounted on shaft B) against the bent end *i* of the compressor-arm H. The compressor-trip D is pivotally attached at one end at *j* to the hub 10 of the needle G and in this view is shown in its intermediate position, while the sheaf is being packed and previous to tripping, whereas in Fig. 2, which clearly shows its pivotal position with the hub of the needle, it is in its raised position, as hereinafter explained. *k* is the sprocket-chain, which drives the knotter-operating mechanism. (*Vide*, also, Fig. 3.) At X is shown a lug on the hub 10, against which the toe *b* of the compressor-trip D rests prior to the packing of the sheaf, or when the sheaf is first being packed. When a sufficient weight of sheaf has been packed on top of the compressor-trip D, the toe part *b* presses on the lug X and causes the hub 10 and the needle-shaft F to rock. The rocking of the needle-shaft releases the lock-arm E (shown in Figs. 5 and 6) when the needle and knotting mechanism is thrown into operation, and as the needle moves around into the position shown in Fig. 2 the toe *b* and the lug X on the hub move away from each other, and the toe *b* or incline formed beneath the compressor-trip D runs upon the wheel O and is raised up against the bottom of the sheaf while the knot is being tied.

In Fig. 2 the compressor-trip D, having been slightly depressed by the packed sheaf, has moved the needle rock-shaft F and disengaged the clutch-trip arm E from the stop *l*, formed on the clutch L, pivoted to the sprocket-wheel M (more particularly referred to under Fig. 3) thus setting in motion the knotter-operating mechanism. In this view, Fig. 2, the sprocket-wheel A and the knotter cam-disk N on shaft B, which carries the eccentric semicircle K, has made about a half-revolution or more in the direction of the arrow-head and the knot has been tied and the cord cut, and the sheaf which is in the act of being discharged by the discharge-arms C, which have completed more than a half-revolution in the direction of the arrow-head, has thrown the compressor-arm H into the position shown in the drawings, the arm H being free to swing on its pivot h, because its upper end i has ceased to engage with the eccentric semicircle K, which has been moved out of its way. In this view it will be noticed that the compressor-trip D, being pivotally attached at one end to the hub of the needle G, moves longitudinally and upwardly as the needle embraces the sheaf, the toe b of the slanting shoe d, formed under it, running upon the grooved wheel O, which is journaled on a shaft O', running in brackets O'', attached to the frame and raising the compressor-trip D against the bottom of the sheaf, while the needle G and the compressor-arm H embrace or compress the sheaf, holding it tightly until the knot has been tied and the twine cut and the needle commences to recede to the position it occupies during the packing of the new sheaf.

In Fig. 3 c is the sleeve supported on the frame of the machine by standard 11 and frame-piece 12, Fig. 2, which supports the knotter-operating shaft B, and k is the sprocket-chain which is kept taut by the spring-idler sprocket-wheel P. In this view the clutch trip-arm E is engaged with the stop l, formed on the clutch L, which is pivoted to the sprocket-wheel M by pivot n. The end of the clutch which carries the stop l moves on the guide-lug o, which passes through the slot p, formed in the clutch. Q is the packer-shaft, which rotates continuously in the direction indicated by arrow-head when the machine is in operation, carrying with it the contact-lugs g, formed thereon. The clutch trip-arm E is rigidly attached to or forms part of the needle-shaft crank-arm R, attached to the needle rock-shaft F. S is the pitman-rod pivotally attached at r to the needle-shaft crank-arm R, and so arranged, as hereinafter explained, as to be capable of yielding slightly at the proper moment by reason of the mode of connection of its upper end to the crank-pin s, and thus shortening the length of the pitman S at the moment that the clutch trip-arm E is disengaged from the stop l when tripped by the motion of the compressor-trip D. When the clutch trip-arm E has become disengaged from the stop l, the heavy or weighted end t of the pivoted clutch L drops, throwing the contact-roller m on the clutch into the path of a rotating driving-lug g on the packer-shaft Q, the parts assuming the position indicated in Fig. 6. When the driving-lug g comes in contact with the contact-roller m, the sprocket-wheel M is carried round, driving the sprocket-wheel A and actuating the knotter-operating shaft B, which sets in motion the knotting mechanism, as well as the needle rock-shaft F, which derives its rocking motion by the raising and lowering of the needle-shaft crank-arm R by means of the pitman-rod S, which is attached at its upper end to the crank-pin s, rotating with the sprocket-wheel A. The discharge-arms C C continue to move round with the shaft, discharging the bound sheaf, until they have completed one revolution, when the clutch-trip arm E again comes round and engages with the stop l, throwing the contact-roller m away from the driving-lug g, when the motion of the sprocket-wheel M is arrested and the needle, as well as the knotter-operating mechanism, ceases to move until the compressor-trip D, weighted down with the newly-packed sheaf, again disengages the clutch trip-arm E from the stop l, and the needle, knotting mechanism, and the discharge-arms C C are again put in motion. The spring-idler sprocket P keeps the chain k taut, as shown in Fig. 3, by reason of the coil-spring u, which passes round a hub through which the packer-shaft passes, and is secured at its upper end to the binder-frame, and bearing at its lower end against a lug v, formed on the hanging bracket w, to the lower part of which the idler sprocket-wheel P is journaled. (See Fig. 5.) The upper end of the bracket w is pivotally attached to the packer-shaft Q, the lower end being thrown out by the pressure of the spring on the lug v, as before mentioned. At 21 (see Fig. 10) is shown the knotter-bill, and at 22 the knot ready for stripping.

Figs. 7, 8, 9, and 10 illustrate the construction of the adjustable connection of the pitman S with the crank-pin s on the sprocket-wheel A. S is the pitman-rod, the upper end of which is screwed into the pitman-box T. The end of the pitman projects into the interior of the pitman-box, and around it is a coiled extension-spring bearing on one end on an adjusting-nut y and on the other against the movable box z, which by the action of the spring x bears against the bottom of the crank-pin s. As the pitman S has in moving the needle-shaft crank-arm R up and down both a pulling and a pushing action to insure rigidity of connection at the proper time, a cam U is formed on the shoulder of the crank-pin s and rigidly attached thereto and is notched at V. This cam engages with a lug W, formed on the pitman-box T, which is hung on the crank-pin s, the periphery of the cam moving over the lug W during the rotation of the sprocket-wheel A and taking the push of the pitman S off the coil-spring x within the pitman-box T. When the clutch trip-arm E has completed its rotation and become engaged with the top l and when the trip action again takes place, the stop W is in the position indicated in Fig. 9, so that when the clutch trip-arm E, which is attached to the pitman, is thrown up the pitman-rod yields by reason of the lug W on pitman-box T entering the notch V in the cam U, so as to allow of the spring x being compressed, and the box z, which bears against the crank-pin s, has a play between the points 1 and 2, (shown in Fig. 8,) thus permitting the shortening of the pitman-rod S at the proper moment.

Fig. 4 illustrates the tension-regulator, which is also shown in position in Fig. 3. 3 is a bracket attached to the frame and formed of a T-shaped piece of metal, the parts forming the head of the T being bent at right angles and having two eyes therein through which, as well as through a slot 4, formed in the tension-rod 5, the binder-twine is threaded. One end of this tension-rod is pivotally attached to the compressor-trip D on the hub of the needle and the other rests on a guide formed by a hole in the bracket. When the needle G is at rest, the cord passes through the eyes and slot in a straight line, allowing it to pass through without friction and permitting a free delivery of cord to the binder while the sheaf is being packed into it. When the needle moves to bind the sheaf the tension-rod 5 is drawn over by the motion of the hub of the needle G and pulls on the string and puts a tension thereon at the proper time when the knot is being made.

When the machine is in operation, the packer-shaft Q is continuously rotating, and the packers J J, affixed thereto, pack the newly-forming sheaf on top of the compressor-trip D. When a sufficient weight has been imposed on the compressor-trip D, it becomes depressed, causing the needle rock-shaft F to move, and disengages the clutch trip-arm E from engagement with the stop l. The knotter-operating mechanism and discharge-arms, as well as the needle rock-shaft, then commence to operate. A tension is put on the binder-twine, the knot tied, the twine is cut, and the bound sheaf is discharged, as already described, and when the clutch trip-arm E becomes again depressed, after the discharge of the sheaf, it engages again with the stop l, throwing the contact-roller m away from the driving-lug g, and the discharge-arms, knotter-operating mechanism, and needle cease to move, assuming and retaining the normal position shown in Fig. 1 until the compressor-trip D again becomes depressed, disengaging the clutch trip-arm E from the stop l, when the operation of tying and discharging a sheaf is again repeated.

From an inspection of Fig. 10 it will readily be seen that the knot is complete up to the point of being ready for stripping before the needle has commenced to move back, and consequently the knot is tied while the compressor is moving with a longitudinal and upward course, as the crank-pin has just arrived at the dead-center. This arrangement has the following advantages: By continuing the compression of the sheaf by the compressor-trip till the knot is completed an economy of cord is effected and a better-shaped sheaf is produced. If the compressor-trip had not a longitudinal and upward motion as the knot is being tied, all the compression of the sheaf at that time would be from the moving needle, which would tend to produce a flattened sheaf, which would necessarily be of greater circumference than the round sheaf produced when the compression is from two sides at once, and in consequence of this a saving of cord is effected by the twofold compression while the knot is being tied. Further, as the sheaf is compressed by the compressor-trip after the cord has been laid round it and grasped in the cord-holder the knotter-bill can take with ease the necessary cord to form a knot without strain on the knotter.

What I claim as my invention is—

1. In a harvester-binder, the combination, with the needle rock-shaft actuated as specified, of the needle, a knotter-operating disk, an eccentric semicircle on the knotter-operating disk, a compressor adapted to be operated by said eccentric semicircle, and a compressor-trip adapted to have a longitudinal and upward motion as the knot is being tied, substantially as specified.

2. In a harvester-binder, the combination of the needle G, mounted on a hub 10, having a lug X, a pivoted compressor D, pivotally attached to and carried by the hub of the needle G, the shoe d, having an inclined bottom and toe b, engaging lug X, the needle rock-shaft F, actuated as specified, and the grooved wheel O, substantially as described.

3. The combination of the sprocket-wheels A and M, hanging bracket w, lug v, sprocket-wheel P, coil-spring u, mounted on a hub around the packer-shaft Q and having one end bearing against part of the frame and the other against said bracket, and the chain k, around wheels A and P and under wheel M, substantially as specified.

4. The combination of the pitman-rod S, pitman-box T, adjustable spring x, inclosed in said box, movable box z, bearing against the crank-pin s, the notched cam U, and lug W, substantially as described and shown.

Woodstock, November 29, 1890.

JOHN LUND.

In presence of—
  J. HARRY WEBB,
  GEO. A. GRAY.